(12) United States Patent
Moore et al.

(10) Patent No.: US 7,853,607 B2
(45) Date of Patent: Dec. 14, 2010

(54) RELATED ACTIONS SERVER

(75) Inventors: Dennis B. Moore, Hillsborough, CA (US); Joerg Beringer, Los Altos, CA (US)

(73) Assignee: SAP AG, Waldorf (DE)

( * ) Notice: Subject to any disclaimer, the term of this patent is extended or adjusted under 35 U.S.C. 154(b) by 216 days.

(21) Appl. No.: 11/509,893

(22) Filed: Aug. 25, 2006

(65) Prior Publication Data
US 2008/0052274 A1  Feb. 28, 2008

(51) Int. Cl.
*G06F 17/30* (2006.01)
*G06F 7/00* (2006.01)

(52) U.S. Cl. .............. 707/769; 707/708; 707/767; 707/782; 709/203; 709/226; 717/102

(58) Field of Classification Search .......... None
See application file for complete search history.

(56) References Cited

U.S. PATENT DOCUMENTS

| | | | |
|---|---|---|---|
| 6,430,563 B1 | 8/2002 | Fritz et al. | |
| 6,594,671 B1 * | 7/2003 | Aman et al. | 707/103 R |
| 6,633,869 B1 * | 10/2003 | Duparcmeur et al. | 707/6 |
| 7,072,934 B2 * | 7/2006 | Helgeson et al. | 709/203 |
| 7,124,096 B2 | 10/2006 | Dutta et al. | |
| 7,213,047 B2 * | 5/2007 | Yeager et al. | 709/202 |
| 7,219,073 B1 | 5/2007 | Taylor et al. | |
| 7,305,381 B1 | 12/2007 | Poppink et al. | |
| 2003/0069943 A1 * | 4/2003 | Bahrs et al. | 709/219 |
| 2003/0154154 A1 | 8/2003 | Sayal et al. | |
| 2004/0162816 A1 | 8/2004 | Irle et al. | |
| 2005/0060290 A1 | 3/2005 | Herscovici et al. | |
| 2005/0149496 A1 | 7/2005 | Mukherjee et al. | |

FOREIGN PATENT DOCUMENTS

| | | |
|---|---|---|
| EP | 1 324 226 | 7/2003 |
| EP | 1324226 | 7/2003 |
| EP | 1457908 | 9/2004 |
| EP | 1591889 | 11/2005 |
| EP | 1619615 | 1/2006 |
| EP | 1619619 | 1/2006 |
| EP | 1628211 | 2/2006 |
| EP | 1628256 | 2/2006 |
| WO | WO-00/58863 | 10/2000 |
| WO | WO-03058371 | 7/2003 |

OTHER PUBLICATIONS

EP Application No. 07000569.9-1527 EP Search Report dated Apr. 24, 2007 (client ref # S8501 EU-ro).
Reference: S 8920 EU-ds; EP App No. 07016677.2-2201; Extended EP Search Report dated Nov. 19, 2007.
Final Office Action mailed May 14, 2008 for U.S. Appl. No. 11/333,961.
Non-Final Office Action mailed Oct. 14, 2008 for U.S. Appl. No. 11/333,961.

* cited by examiner

*Primary Examiner*—Greta L Robinson
*Assistant Examiner*—James J Wilcox
(74) *Attorney, Agent, or Firm*—Blakely Sokoloff Taylor & Zafman

(57) ABSTRACT

Methods and apparatuses enable providing an action related to a business object in response to receiving a request to access the business object. In one embodiment, a related action is identified based on a context of a work environment from which the request is generated. The context may include a business role of the requester, a type of the requested object, a specific instance of the object, a relationship of the requester to the specific instance, a channel from which the request is received, etc. The identified related action is provided to a consumer of the business object.

19 Claims, 7 Drawing Sheets

RELATED ACTIONS SERVER

FIELD

Embodiments of the invention relate to modeled software applications, and more particularly to a server that suggests business process actions related to a requested data object.

BACKGROUND

In a business context, a user typically searches for information in the context of doing something with the information. Rather than just being interested in the information itself, a user in a business context may seek information pertinent to one or more actions of a business process task. Additionally, work in a business context may focus more on the use of business objects, or data objects with a business purpose, rather than just information. Traditional search algorithms are typically inadequate at dealing with business objects, in terms of both targeting a search to the business objects, and providing the resources a user wants to perform work on the search results.

In addition to the search scenario, traditional work contexts tend to focus on the "task at hand." While focusing on a particular task can provide some benefit, it can be restrictive in terms of the scope of what the user is trying to accomplish. Traditional applications and business objects fail to provide adequate mechanisms for offering options to a user that would allow the user to be more productive from within any given context.

SUMMARY

Methods and apparatuses enable providing an action related to a data object. A data object for which to provide the related action is identified. The data object can be identified in conjunction with a search query and/or by identifying a data object for which access is requested in an application. In one embodiment, a related action is identified based on a context of a work environment in which the data object is instantiated. The context of the work environment may include any of a business role of the requestor, a type of the requested object, a specific instance of the object, a relationship of the requestor to the specific instance, a channel from which the request is received, etc., or some combination. The identified related action is provided to a consumer of the data object. The data object consumer can then access the related action to perform additional operation related to the data object.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
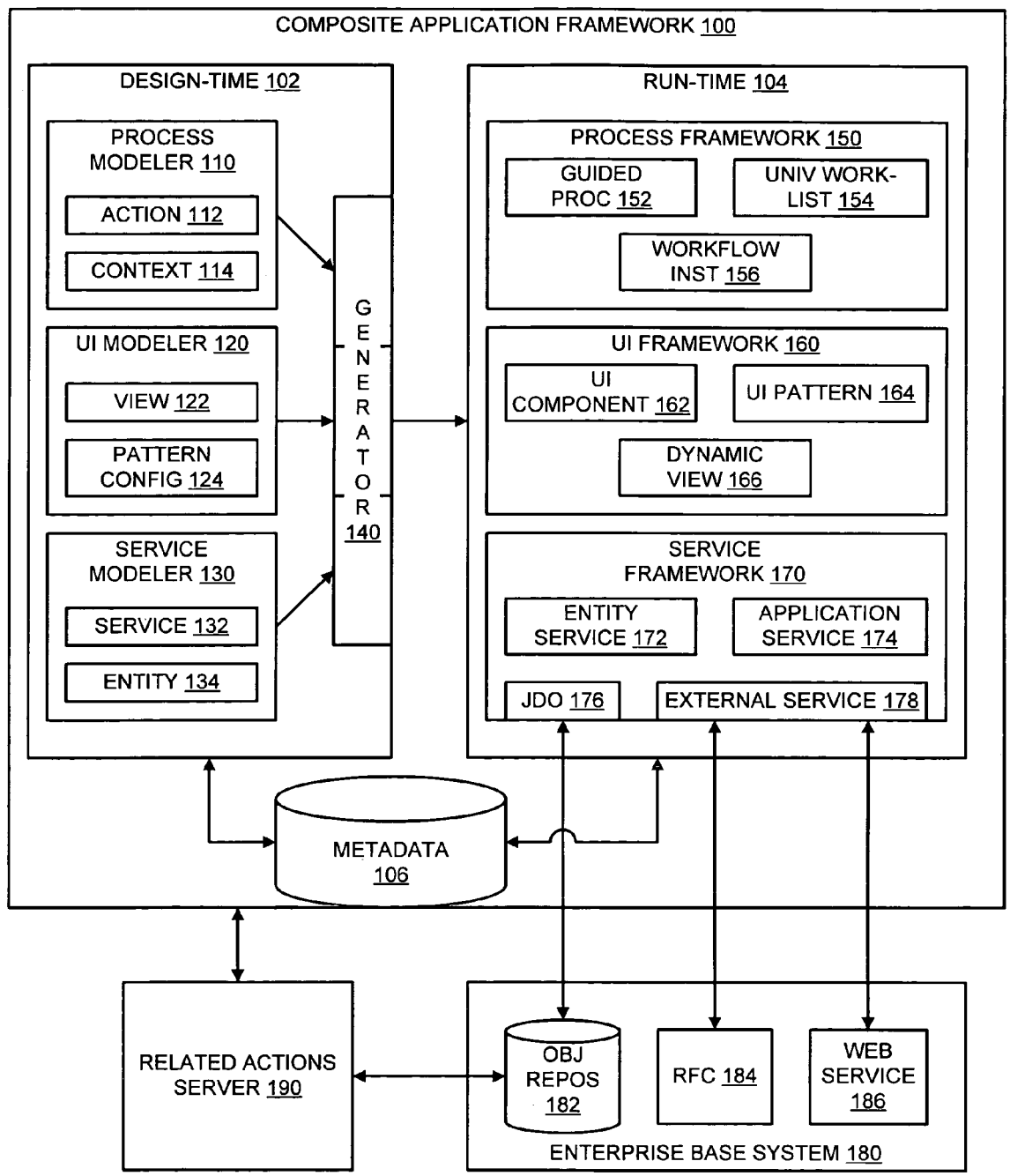
FIG. 1 is a block diagram of an embodiment of an application framework with run-time and design-time components.

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, with an overview description of embodiments of the invention, followed by a more detailed description with reference to the drawings.

A related actions service provides one or more actions related to a business object. As used herein, a business object refers to a data object having a business application and/or purpose, and/or a use in an enterprise or organization. A data object is a fundamental building block of an application, and includes data with parameters or rules regarding its use or interaction with other information or functions. In one embodiment, a data object includes metadata that indicates one or more relationships between the data object and another data object, or between the data object and particular business actions or tasks, etc. The relationship data, or relatedness information, can indicate any relationship between the data object and a manner in which the data object can be used, or information that can be used with or affected by the data object. In general, relatedness information indicates a frequency of use of a particular data object with a particular action or object. In one embodiment, the metadata indicates a relationship by storing identifiers of other objects, or of business processes or tasks. Alternatively, or in addition, the metadata can store an identifier for the data object that acts as an index into a related actions database or lookup table. The related actions service indicates actions that are related to the data object that may be indicated in the metadata. In any implementation, the relationships can be named or identified, and may be named in each direction between the data object and the related item. The naming of the relationships can provide a mechanism for the related actions server to map the relationship to a query. For example, an object for "John Smith" can have a relatedness field "managed by=Jane Doe" and/or a field "manages=David Johnson."

In one embodiment, the related actions service is provided by a related actions server. A related actions server provides related actions services in one or more implementations. For example, a related actions server can operate in conjunction with a search service to provide related actions for one or more data objects returned to a query. In another example, the related actions server can identify a related action for an active data object in a work environment. An active data object refers to a data object that is provided to a user as part of an application (e.g., a composite application) or a task to perform. A work environment refers to the applications, functions, and permissions available to a user. Thus, a related actions server can operate to provide additional content to a search service, and can provide suggested content to a user that accesses a data object within the context of a work environment. The related actions server can provide the related actions content in response to identifying a relationship between a data object and an action. The related action is presented to provide the ability to access the action.

The related actions server accesses the relatedness information associated with a particular data object, and may selectively provide related actions to the context in which the data object is active (e.g., as a result of a search, as an accessed data object). In one embodiment, the related actions server provides the related actions selectively based at least in part on contextual awareness information that indicates one or more context characteristics of a work environment. The context characteristics may include one or more of a business role associated with the request or work environment, a type of the object, a characteristic of the specific object instance, a relationship of the query or data object request to the object instance, a work context, a channel from which the request or query is received, etc. In one embodiment, the related actions server accesses all related actions and filters the actions based on the context characteristics. Any related actions that are filtered out based on the context characteristics are not presented, or they may be presented, but access to them may be denied. In another embodiment, actions are accessed based on the context characteristics, and only pertinent actions are accessed.

Through the related actions server, a system can provide contextually aware search results. The search results can include access to actions to be performed on one or more objects. Additionally, a system can provide suggested actions within a work environment that allows access to actions that are related to a data object.

As discussed above, the related actions server can provide related actions content based on a context of a search query or an object access. The context characteristics are explained in more detail below. A business role refers to a position or a responsibility within an organization (e.g., support person, sales rep, manager, customer, supplier). For example, a person in a support role may be interested in information about escalations or problems, which can be provided with respect to systems associated with the role. In another example, if a manager accesses or searches for an object representing an employee working under the manager, a related action for "salary increase" may be provided. However, such a related action would not be presented for a query generated from a supplier role or a customer role.

With regards to a type of the object, the manager in the example above would not receive a "salary increase" action for a customer object type that is being searched. Thus, the manager may receive a related action for "salary increase" for an employee object type, and not for a customer object type.

With regards to the specific object instance, a characteristic of the specific object instance could provide information that is used to provide related actions. For example, an employee object in general may be a candidate for assigning a task. Thus, accessing a business object related to the employee, in general a related action for assigning a project to the employee may be available. However, in the case of the specific employee, perhaps the employee is on sabbatical, and the specific employee is unavailable for the assignment. Thus, the related actions server may not present such a related action for the specific object instance.

With regards to a relationship of the query or data object request to the object instance, a relationship between the source of the query or data object request and the object instance can provide another filter for related actions. For example, a manager may be presented a related action for "salary increase" with respect to an employee working under the manager. However, if the manager accessed an object representing an employee not under the manager, the "salary increase" action would not be presented. The relationship of the manager to one employee is that of "manager," whereas there may be no relationship of the manager to another employee.

With regards to a work context, a related action could also be related to the work context from which a query is generated. For example, within the context of a budget worksheet, access to a particular object will produce different related actions than access to that object within the context of a project status report.

With regards to different channels, a related action may be available on one channel, and not another. As used herein, a channel refers to an interface from which access is made (e.g., a laptop, a mobile device, voice, over a wireless connection, over a secure channel, etc.). For reasons of security, or simply for practical reasons, certain actions are not available to certain channels, while they are available on other channels. For example, a query for "Product Ford" may provide a related action for "see product diagram," which would not be available through a voice channel, but may be available through another channel.

The above description of elements of context does not represent an exhaustive, nor an inclusive list. Each element could be used individually by the related actions server to determine how to provide related actions content. In addition to using each element of context individually, a related actions server can provide related actions based on multiples of the contextual elements set forth above, in any combination. In addition, the usage scenarios for the related actions are not limited to a desktop enterprise scenario. Related actions can be applied to a device connected to an enterprise system executing enterprise software (e.g., enterprise composite applications), but also to an environment that supports enterprise extensions (e.g., the DUET offering from MICROSOFT CORPORATION of Redmond, Wash. in conjunction with SAP AG of Walldorf, Germany, which provides business process extensions for an office software environment), to an environment occasionally disconnected from the enterprise (e.g., MOBILE available from SAP AG), or other scenarios. In one embodiment, the related actions are applied to a work center environment to enable related and suggested actions to be available to a user in the context of a work center or work activity/task dashboard.

The related actions server can be implemented in a number of ways. In one embodiment, the related actions server is embodied in a search service wrapper, or a service or manager that manages content from one or more different search services. In one embodiment, the related actions server is embodied in a standalone entity that receives and/or monitors searches and/or data object requests. Such an implementation can include providing the related actions server to work in conjunction with a data object server of an enterprise server. In one embodiment, the related actions server is implemented as an agent in an interface with a connection to a mobile device and/or in a business process extension of an office software suite.

In one embodiment, a search is performed, and when a parser calls a search service in response to receiving a search query, the search service is a service wrapper that orchestrates providing queries to, and receiving content from, multiple potential search services. The parser can also call the related actions server. The related actions server can operate in parallel to the one or more search services. In one embodiment, the related actions server simply provides actions related to the data object that is the subject of a search query or a data object request, without considering the context of the query/ request. In another embodiment, the context is considered. The related actions server can operate after a search has been performed (i.e., not in parallel), and receive the content of the search results, and enhance the results with related action content. The final output stream generated in response to the search query can include metadata that describes related actions for each element of the output stream, which is then interpreted by a search output formatter. The formatter can provide additional filtering of the output stream, for example, by stripping out particular content and/or related actions.

In one embodiment, a search service utilizes the related actions server and an advertisement service (discussed in more detail below). In conjunction with an advertisement server, the related actions server may be implemented in a number of ways. A query is received and searched. After the search, in one embodiment, the related actions server relates actions to the search results, and then the advertisement server provides advertisements. Alternatively, the advertisement server could provide advertisements to the search results, and then the related actions server relates the results. In the first implementation, the advertisement server enhances the additional content provided by the related actions server, and may provide advertisements associated with the identified related actions. In the second implementation, the related actions server enhances the additional content provided by the advertisement server, and may provide related actions associated with the advertisements. In another implementation, the related actions server and the advertisement server operate in parallel.

In one embodiment, the related actions server flags or indicates that related actions are additional content. A formatter that prepares and presents the content to a visualizer can format a results output with the related actions clustered on the output. Thus, the results can be provided in one section of a display, and the related actions be clustered in another section of the output display.

FIG. 1 is a block diagram of an embodiment of an application framework with run-time and design-time components. In general, composite application framework 100 leverages and enhances underlying enterprise base system 180, which could include one or more elements of data and/or functionality to perform operations. Composite application framework 100 provides a structure with which to generate composite applications, which are modeled/generated software. Composite applications may support semi-structured processes, handle event-driven and knowledge-based business scenarios, and/or support collaboration. In one embodiment, composite applications support the JAVA stack. The composite applications may be broken down into various portions, each of which may be separately generated/modeled. The composite application portions may, in one implementation, be implemented as Enterprise Java Beans (EJBs), and in other implementations, the design-time components may have the ability to generate the run-time implementation into different platforms, such as J2EE, ABAP, or NET. In one embodiment, composite application framework 100 is the composite application framework (CAF) available from SAP AG.

Composite application framework 100 generally allows composite applications to work within existing system environment by decoupling the applications from the underlying enterprise platform. Decoupling the applications from the underlying enterprise platforms may include providing communication to back-end systems via a central interface and providing a back-end-independent object model. Composite application framework 100 includes design-time components 102 and run-time components 104. Design-time components 102 include modeling components with which to generate a composite application, and one or more mechanisms to generate the model. In general, design-time components 102 are responsible for developing composite applications that are executed by run-time components 104.

Design-time components 102 include process modeler 110, UI modeler 120, and service modeler 130. These modelers are not necessarily separate entities, although they may be. Furthermore, additional modeling tools may be provided within design-time components 102. In general, the modelers allow for integrating business objects, business services, business processes, user interfaces, etc. Process modeler 110 includes the capability of generating one or more actions 112, which represent the various phases of a process. Each action 112 has an associated operation or operations that represent the work of action 112. Action 112 may be part of an activity that is generated, or part of a guided procedure that provides interaction with the user on performing operations. In an embodiment where action 112 is part of a guided procedure, process modeler 110 includes information with each action 112 to execute the guided procedure.

Process modeler 110 also includes context 114, which provides awareness to the process regarding the enterprise system in which it is operating. Where a function is used from an application that does not understand the enterprise system, process modeler 110 can wrap the function in metadata to incorporate the function into the system.

User Interface (UI) modeler 120 provides the ability to generate a user interface and provide views of data/processes that can be accessed through a composite application generated with composite application framework 100. UI modeler 120 can generate any of a number of views 122 on data. In one embodiment, standard views or patterns are used for each application developed. A user interface may include certain elements from a template. Thus, user interfaces may have certain common components and provide a familiar look and feel across multiple applications. Certain views are dependent upon the environment in which the application is executed. Views 122 may include capability to dynamically generate views based on roles, authorizations, and activities associated with the application. Pattern configuration 124 of UI modeler 120 allows the use of templates and standard UI components.

Service modeler 130 enables a composite application to access data. Data objects are accessed via services. Thus, service modeler 130 provides the service-oriented model through which data are accessed. In one embodiment, service modeler 130 provides an enterprise service architecture (ESA), where applications are developed through a service-driven, rather than a model-driven, architecture. A service-driven architecture provides access to callable services that provide interaction with data. Service modeler 130 includes service 132, which represents one or more service that may be provided. Service 132 may include, but is not limited to, guided procedures, object monitoring, standalone actions, programs or functions, etc. Entity 134 of service modeler 130 provides a component generated to access a service within the enterprise, or a web service. An enterprise or web service as described here refer to entities within a network (either within a network of the enterprise, or within the Internet) that are addressable and provide a capability based on a request and/or input parameters (e.g., flight booking).

Generator 140 represents one or more components to transform the model into run-time components. In one embodiment, generator 140 is a single component, while in alternate embodiments, generator 140 is multiple components.

Run-time components 104 provide instantiation of the items modeled with design-time components 102, and include various frameworks within which object or service instances operate. Process framework 150 represents a framework under which one or more instances of processes can execute. For example, process framework 150 may include guided procedure 152, universal worklist 154, and/or workflow instance 156. Guided procedure 152 represents an instance of a guided procedure as discussed previously. Universal worklist 154 provides a list of all workflow or process items available to a user. A workflow or process may be available to a user through an operation requested of the user on the workflow/process, and/or through the user having a responsibility authorization with respect to the workflow/process. Universal worklist 154 may be used to access work centers for each process available. Workflow instance 156 provides an example of one or more workflows that represent work requested of a user. The workflow may have one or more actions for the user to perform.

UI framework 160 provides abilities to render views on data and processes. In one embodiment, UI framework 160 includes a view manager (not shown) that provides dynamic management of content that will be displayed/presented to a user. UI framework 160 may include UI component 162, which represents one or more elements of a user display. In one embodiment, UI component 162 includes elements for rendering the display in a web browser, although another environment could be used. In one embodiment, a separate application viewer could be used. UI pattern 164 provides patterns and standard elements for rendering the user interface. UI pattern 164 may provide UI component 162. UI pattern 164 may be a template with various components 162 to provide buttons, links, text, etc., that may be standard to every application generated, or partially customized with instance-specific data.

In one embodiment, UI framework 160 includes dynamic view 166. Dynamic view 166 represents a view that has one or more dynamic components, and may change the content of the application that provided to a user. Dynamic view 166 changes content based on an authorization of a user. The content can be changed dynamically to reflect personnel structuring changes (e.g., moves, promotions, terminations), and change of the underlying data or service content.

Service framework 170 implements the data access through services available to the user. A user may have access to one or more entity services 172, application services 174, JAVA data object (JDO) services 176, and/or external services 178. Application service 174 represents services local to the composite application, or directly accessible by the application. JDO 176 can access object repository 182 of enterprise base system 180. Similarly, enterprise base system 180 may include remote functions that are accessed through one or more remote function calls (RFCs) 184, and one or more web services 186. External service 178 accesses remote elements (for example, RFC 184 and web service 186).

Metadata 106 represents an abstraction of one or more data and/or access/service resources that may be accessed and utilized by design-time components 102 and run-time components 104. Metadata 106 is not necessarily a resource within one of the components, nor is it to be understood as being only available to the components. Metadata 106 provides a repository that includes metadata about business objects, business services, business processes, and/or other application portions for use in modeling and/or executing the application portions. Thus, an application portion may be modeled, as well as the origin of the data, whether in a local database, remote database, or a combination of the two. In one embodiment, the content of metadata 106 includes information extending beyond a specific implementation of an application portion. There could be repositories that describe a specific implementation, which may be filled from a more general repository. Metadata 106 can be understood as including a general, a specific, or a combination of repository information.

Related actions server 190 represents a module or agent that provides related actions content to enhance search results and/or to provide suggested services for accessed objects. Related actions server 190 identifies and provides related actions through one or more elements of composite application framework 100. In one embodiment, related actions server 190 derives or receives contextual information from composite application framework 100 to selectively provide related actions content based on a context of a requested data object access. Run-time components 104 generate instances of modeled elements, which may be monitored by related actions server 190. Related actions server 190 may access data in object repository and/or write information to the repository (e.g., relatedness information).

Figure 2:
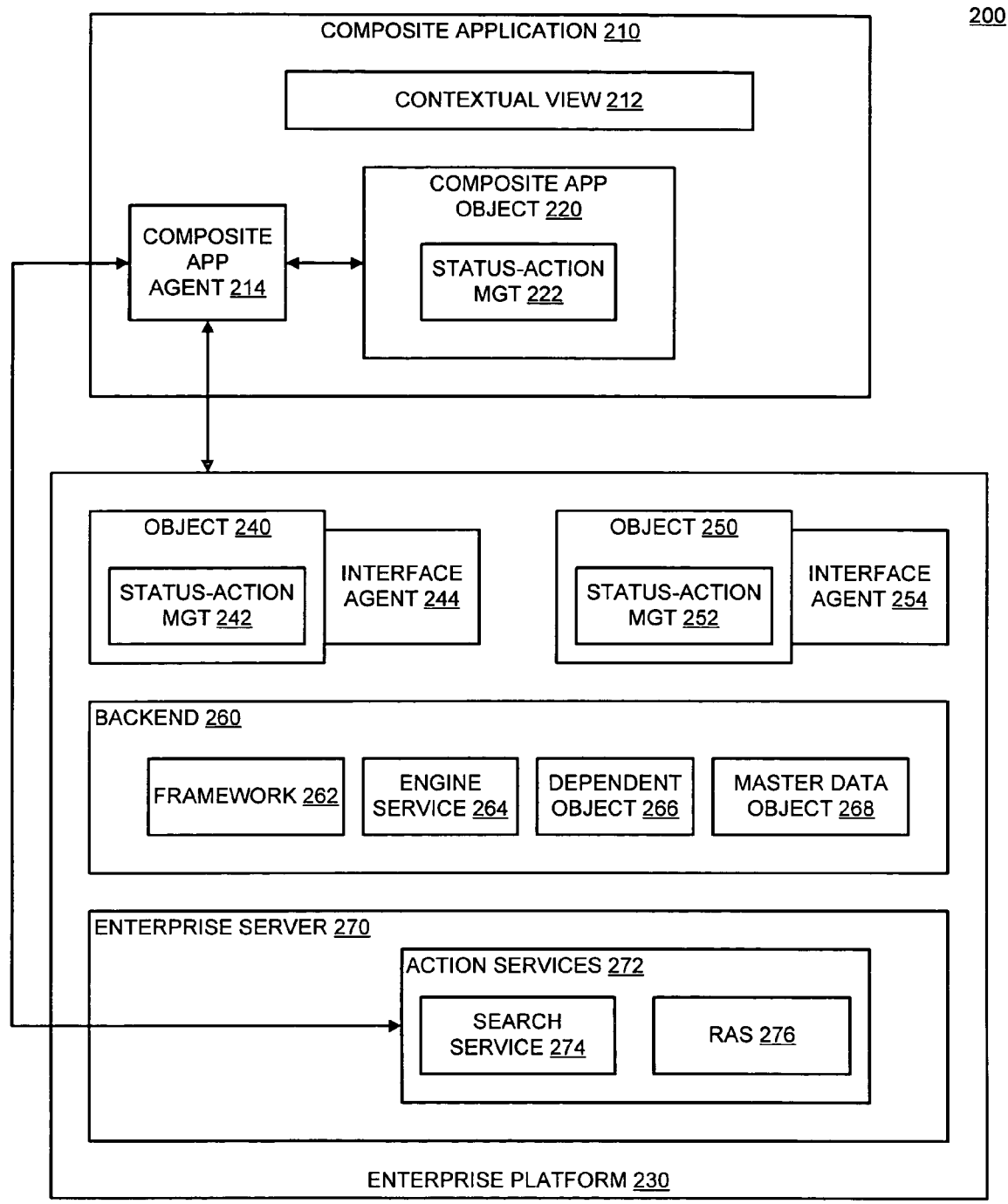
FIG. 2 is a block diagram of an embodiment of a composite application architecture.

FIG. 2 is a block diagram of an embodiment of a composite application architecture. Composite application 210 is an example of a composite application or a composite view according to any embodiment described herein. Composite application 210 is generated with a service-oriented architecture to provide access to cross-functional components of backend systems. Composite application 210 includes contextual view 212, which represents a dynamic view that varies content as the underlying accessed system components change, and varies content in response to different permissions being used to access the composite application. Contextual view 212 includes roles and work centers, composite application-specific user interfaces, etc. With regard to the dynamic views, in response to being invoked by a user with a particular authorization, contextual view 212 may display certain content. In response to being invoked by a different user with a different authorization, or by the same user with a different authorization, different content may be displayed, or different access possible.

Composite application 210 includes composite application (app) object 220, which represents a data object related to composite application 210. Composite application object 220 includes status/action management (mgt) 222, which can be used to track composite application object 220. Status/action management 222 may manage the behavior of the object and provide consistency between the instance of composite application object 220 and enterprise platform 230. Status/action management 222 can also be used to gather statistics about the behavior of composite application object 220 (i.e., relatedness data). In one embodiment, status/action management 222 influences contextual view 212. Composite application object 220 has an associated composite application agent 214, which provides input and output to/from object 220. In one embodiment, composite application agent 214 is multiple agent entities, and may be an input agent and an output agent. Additionally, composite application agent 214 may provide queries or requests to/from composite application object 220. In one embodiment, each object of composite application 210 has a separate agent or agents. In another embodiment, composite application agent 214 is associated with composite application 210, and provides services for multiple object instances within composite application 210. Composite application agent 214 can provide relatedness data to action services 272, described below.

Enterprise platform 230 may have multiple objects 240 and 250, and/or other objects not shown in FIG. 2, each of which may have an interface agent, specifically, interface agents 244 and 254, respectively. Through the agents, objects 240 and 250 may access or be accessed by other components of enterprise platform 230. Objects 240 and 250 also include status/action management 242 and 252, respectively. Objects 240 and 250 represent objects from which specific instances may be generated in composite application 210.

Enterprise platform 230 includes backend 260, which provides backend components for the enterprise. Backend 260 may include framework 262, which may be a composite application framework as described herein to provide a framework with which to generate composite application 210. Engine service 264 provides backend services that are leveraged to generate composite application 210. Dependent object 266 and master data object 268 represent object types available in backend 260.

Enterprise platform 230 also includes enterprise server 270 with action services 272, which represent services that can provide action content for actions related to composite application object 220. Action services 272 include search service 274, which provides search results in response to receiving a search query. Action services 272 also include RAS (related actions server) 276, which represents an implementation of a related actions server according to any embodiment described herein. RAS 276 provides related actions content to composite application 210. In one embodiment, RAS 276 influences the content of contextual view 212, which has content based on a context of composite application 210. RAS 276 may operate in conjunction with search service 274.

Figure 3:
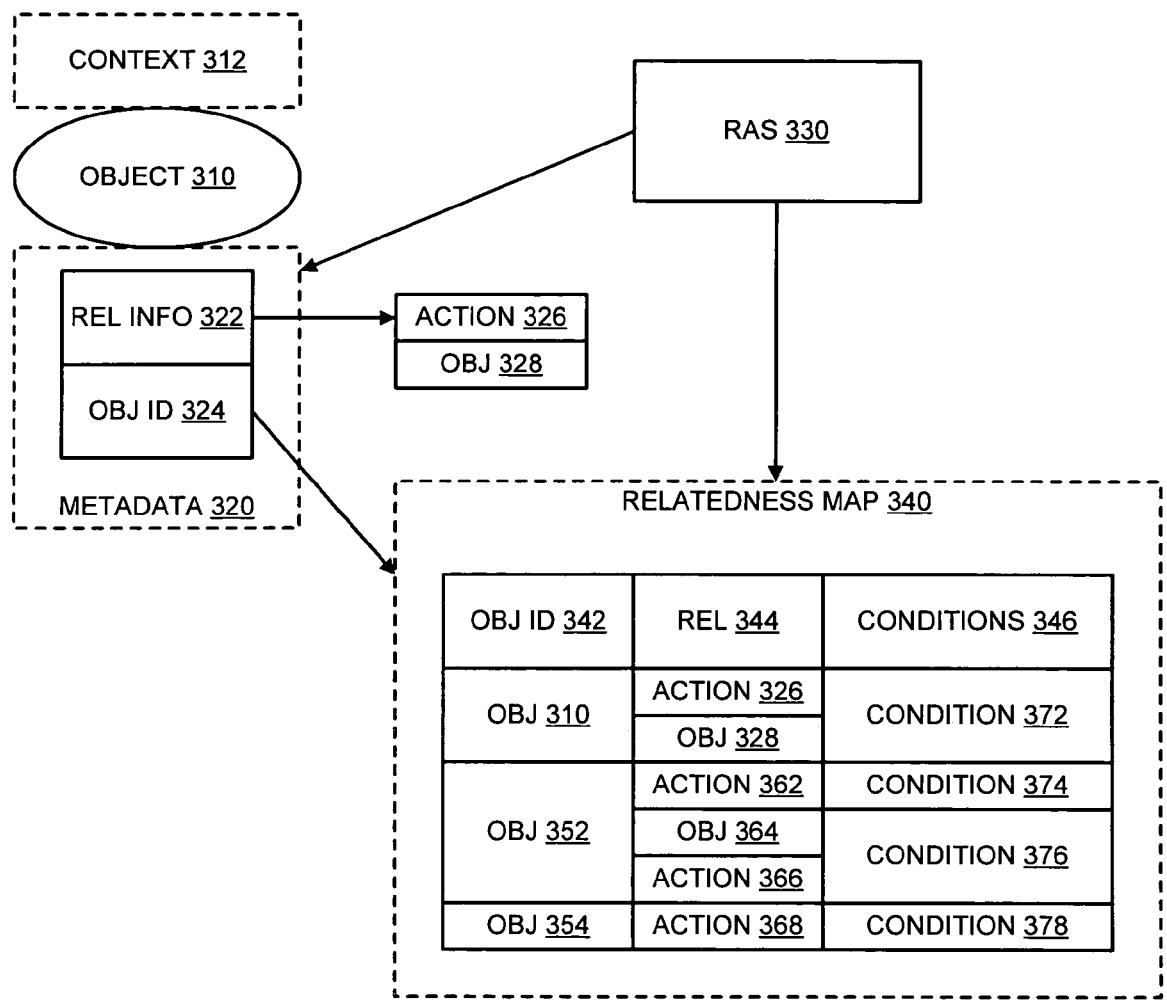
FIG. 3 is a block diagram of an embodiment of a related actions server that accesses relatedness information for an object.

FIG. 3 is a block diagram of an embodiment of a related actions server that accesses relatedness information for an object. System 300 includes object 310, which represents a data object as described herein. Object 310 may be the subject of a search or may be an active data object of a work environment for which related actions content will be presented. Context 312 represents a context as described above, which could influence the related actions content presented for object 310. RAS 330 is a related actions server according to any embodiment described herein, and provides the related actions content associated with object 310. In one embodiment, RAS 330 selectively determines what content to provide based on context 312.

Object 310 includes associated metadata 320, which may include relatedness information (rel info) 322 and/or object identifier (obj ID) 324. Relatedness information 322 can provide a direct relationship map to related action 326 and/or related object 328. In one embodiment, related objects are indicated, but not related actions. The related object and the relationship can indicate to RAS 330 what actions are related to object 310. Object ID 324 may point to relatedness map 340, which may be maintained within an enterprise, e.g., within an enterprise server, within RAS 330, or in another location on the enterprise.

Regarding relatedness map 340, the map may be a database or lookup table that includes entries for one or more enterprise data objects and provides relatedness information. Objects for which such information is provided in relatedness map 340 can be indicated by an object ID 342. For example, object 310 may be indicated in relatedness map 340, as well as objects 352 and 354 (not shown). Each object 310 and 352-354 may have relatedness to an object or action as indicated in relatedness column (rel) 344. As an example, object 310 is shown related to action 326 and object 328, object 352 is shown related to actions 362 and 366 and object 364, and object 354 is shown related to action 368. Any combination of related actions and objects is possible. There may be one or multiple relationships. In one embodiment, relatedness map 340 includes conditions column 346, which indicates conditions 372-378 under which the relationships of relatedness column 344 may exist. Conditions column 346 may indicate, for example, one or more aspects of context under which an action or object relationship may be used to provide relatedness content.

RAS 330 accesses metadata 320 and/or relatedness map 340 to determine what related actions, if any, are available and applicable to object 310. Related actions are identified and provided to a consumer of object 310 to provide access to additional functionality that might be applicable to work being performed by the object consumer.

Figure 4:
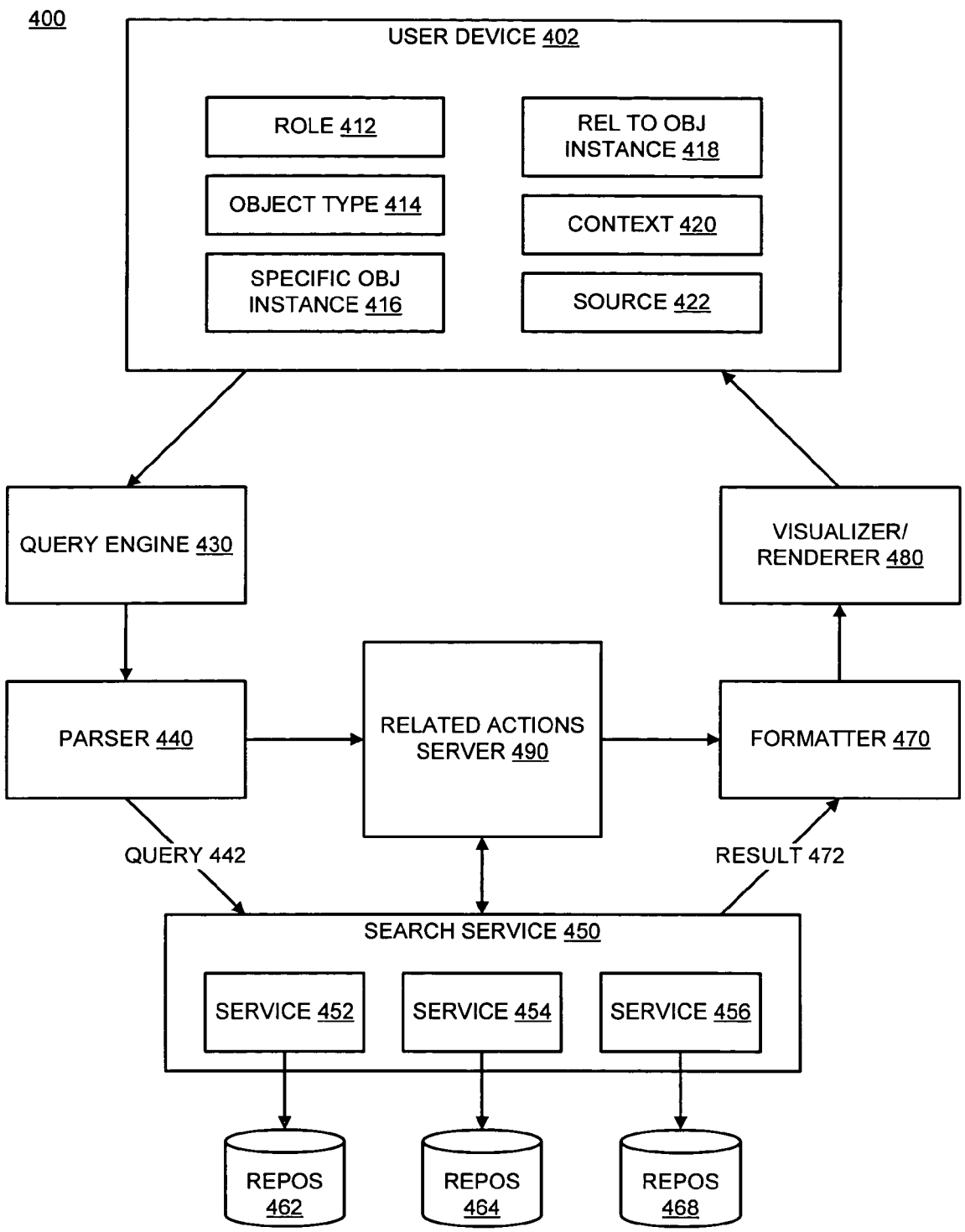
FIG. 4 is a block diagram of an embodiment of a related actions server in a search architecture.

FIG. 4 is a block diagram of an embodiment of a related actions server in a search architecture. System 400 includes user device 402, which includes a work environment to which one or more context characteristics may apply. For example, the work environment of user device 402 may include business role 412, object type 414, specific object (obj) instance 416, relationship to an object (rel to obj) instance 418, context 420, and source 422. Each of the context characteristics is described above. Briefly, business role 412 indicates a responsibility or position within the organization, object type 414 indicates a class or type of the object for which relatedness information may be obtained, specific object instance 416 indicates a characteristic of the specific instance of the object, relationship to the object instance indicates a relationship of the user of user device 402 or the work environment of user device 402 to the object instance (e.g., relationships may change with different roles or contexts), context 420 indicates a work context of user device 402, and source 422 indicates a channel over which a search query is generated.

User device 402 represents any type of electronic device that generates a search query in the enterprise of system 400. User device 402 may be, for example, a desktop computer, a laptop computer, a personal digital assistant (PDA), a mobile phone or other mobile handheld device, etc. The search query may be generated electronically, or via a voice interface. The query is received at query engine 430, which provides a search interface and receives the query through the interface. Query engine 430 passes the query to parser 440, which parses the query. Parser 440 determines the scope of the query and the key terms. In one embodiment, parser 440 identifies one or more available search services that may be used to generate results in response to the query. Parsed query 442 is passed to search service 450, which represents a search container that can forward the query to one or multiple search services 452-456. Services 452-456 may each have a repository (repos) 462-466. One or more of repositories 462-466 may be the same repository, or separate parts of a repository. The repositories may be network entities (e.g., a service available over the Internet), and need not all be on the same network. Services 452-456 generate results from content obtained from repositories 462-466.

In one embodiment, parser 440 forwards query 442 to related actions server 490, either before or after parsing the query. Related actions server 490 can operate in parallel with search services 452-456 to generate content, or more typically will generate content for results generated by search services 452-456. In one embodiment, parser 440 does not forward the query to related actions server 490, but related actions server 490 obtains the query from search service container 450.

Search service container 450 generates result 472, which represents one or more items of content that satisfy the query (i.e., have a statistical relationship as determined by a search algorithm). The search algorithm and the satisfying of a query with content are beyond the scope of this description, and will not be further discussed herein. Result 472 is forwarded to formatter 470, which formats and organizes results content for display. Related actions server 490 may also provide content that is formatted by formatter 470. In one embodiment, formatter 470 clusters related actions received from related actions server 490 for display. Formatter 470 generates links or other access points in the content to provide access to the results and/or the related actions generated by related actions server 490. Formatter 470 forwards the formatted search results, including any related actions content provided by related actions server 490 to visualizer/renderer 480, which provides the formatted content to a display of user device 402.

Figure 5:
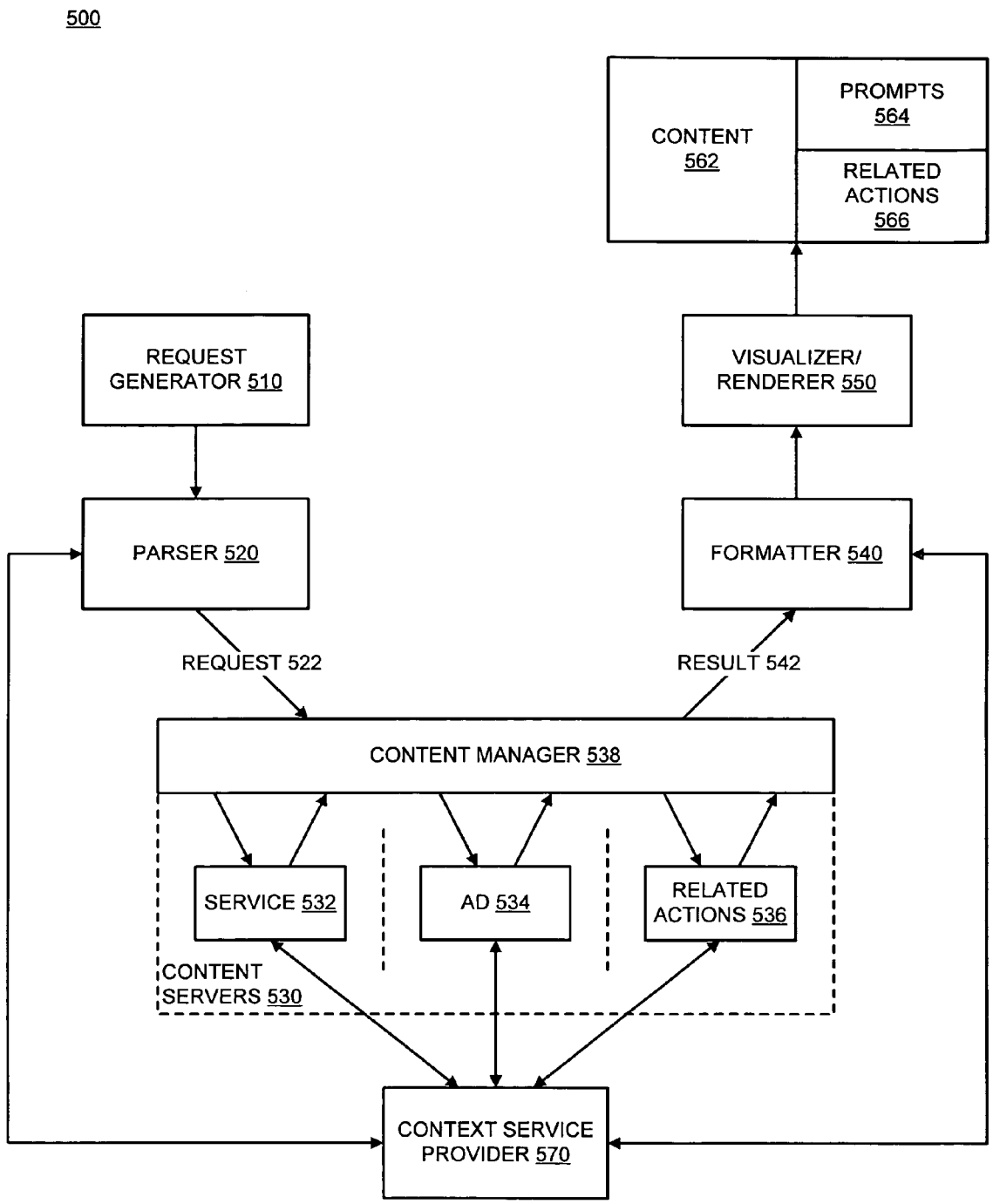
FIG. 5 is a block diagram of an embodiment of a content manager that provides content in response to a request for content.

FIG. 5 is a block diagram of an embodiment of a content manager that provides content in response to a request for content. System 500 includes request generator 510. System 400 of FIG. 4 was specific to a search context. System 500 may apply to a search context, and may also apply to access to a data object from within a non-search context. Request generator 510 may thus be a query engine that provides a search interface, and/or request generator 510 may be an active agent operating in a background of user device. The agent can determine when a request for access to an object is generated, and initiate a process to identify related actions associated with the object. The request for the object can be generated, for example, by selecting the object, which will generate an instance of the object within an application. Objects may be instantiated at the time of loading an application. Object may be instantiated when actively selected from within an application or work environment by a user. When object access is requested, it may invoke a related actions determination.

Request generator 510 can provide the request to parser 520, which may be an example of parser 440 of FIG. 4, or it may represent a data object access mechanism available within system 500. Parser 520 provides request 522 to content manager 538, which represents a container that manages and organizes data object requests, search requests, etc., and provides result 542. Content manager 538 is part of content server 530, which generically represents any service associated with generating, managing, and providing content related to an object for display in a work environment. Content servers 530 include service 532, which represents a search service in the case where request 522 is a search request, or a data object access service in the case where request 522 is a data object access request. Advertisement server (ad) 534 represents a server that provides promoted or advertised content or services (e.g., an advertisement to "nominate <employee> for Employee of the Month," or to "purchase <component> from <provider>," etc.). In one embodiment, advertisement server 534 operates on results of service 532 prior to sending the results to related actions server 536. Alternatively, related actions server 536 can operate on the results of service 532 prior to sending the results to advertisement server 534.

Related actions server 536 determines what business actions are related to one or more objects generated as a result by service 532, and provides related actions content results to content manager 538, which can organize and transmit all results as result 542 to formatter 540. Content manager 538 provides content from service 532, advertisement server 534, and/or related actions from related actions server 536. Formatter 540 formats the results and passes the formatted results to visualizer/renderer 550.

Visualizer/renderer 550 generates a visualization that includes content 562, any prompts 564, which may be suggestions including advertisements, and related actions 566.

In one embodiment, system 500 includes context service provider 570, which determines context of a work environment from which a request is received and/or to which results are to be returned, and provides the context to entities of system 500 that may be influenced by the context. For example, parser 520 and formatter 540 can prepare, respectively, the request and the results according to contextual information. Context service provider 570 can also provide contextual information that influences service 532, advertisement server 534, and related actions server 536. In one embodiment, context service provider 570 may also receive information that informs the context of the request/results. Any of parser 520, formatter 540, service 532, advertisement server 534, and related actions server 536 can provide information to context service provider 570, which can be distributed or shared with any other individual entity.

Figure 6:
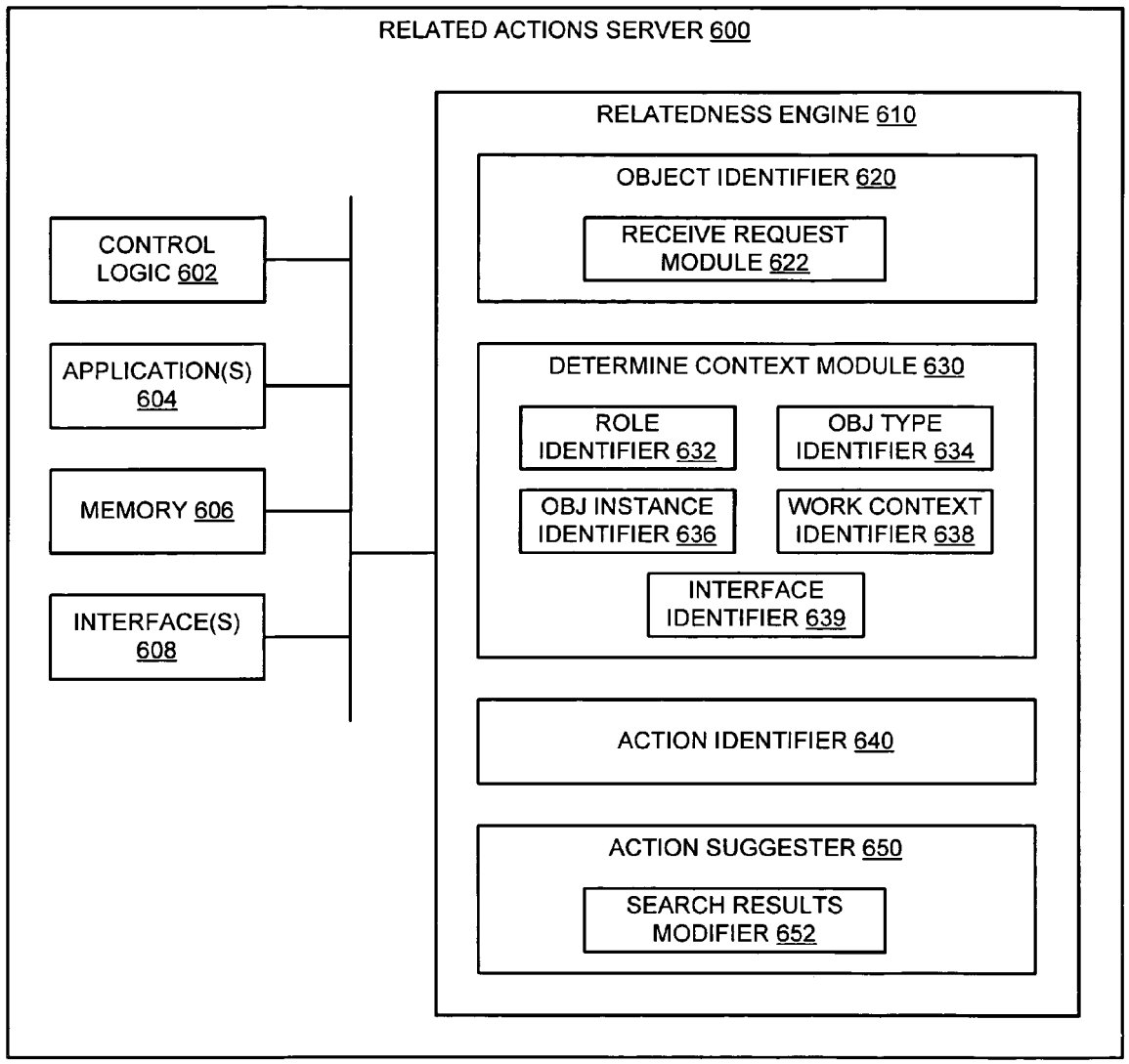
FIG. 6 is a block diagram of an embodiment of a related actions server.

FIG. 6 is a block diagram of an embodiment of a related actions server. Authentication agent 600 includes control logic 602, which implements logical functional control to direct operation of authentication agent 600, and/or hardware associated with directing operation of authentication agent 600. Logic may be hardware logic circuits and/or software routines. The logic may be instructions executing on a processor of a computing device. In one embodiment, authentication agent 600 includes one or more applications 604, which represent code sequences and/or programs that provide instructions to control logic 602. Authentication agent 600 includes memory 606 and/or access to memory resource 606 for storing data and/or instructions. Memory 606 may include memory local to authentication agent 600, as well as, or alternatively, including memory of a system on which authentication agent 600 resides. Authentication agent 600 also includes one or more interfaces 608, which represent access interfaces to/from (an input/output interface) authentication agent 600 with regard to entities (electronic or human) external to authentication agent 600. Interfaces 608 include mechanisms through which authentication agent 600 can be incorporated into a host system.

Authentication agent 600 also includes authentication engine 610, which represents one or more functional components that enable authentication agent 600 to provide authentication operations. The authentication operations include authenticating a hardware platform on the network, and authenticating partitions to the hardware platform. The functions or features of the components include, or are provided by, one or more of object identifier 620, determine context module 630, action identifier 640, and action suggester 650. Each module may further include other modules to provide specific functionality. As used herein, a module refers to routine, a subsystem, etc., whether implemented in hardware, software, or some combination. One or more modules can be implemented as hardware while other(s) are implemented in software.

Object identifier 620 enables relatedness engine 610 to determine which object(s) to check for relatedness. Object identifier 620 includes receive request module 622 to identify an object by receiving a search query or by receiving a request to access an object. In one embodiment, object identifier 620 identifies multiple objects that are to be checked for relatedness.

Determine context module 630 enables relatedness engine 610 to determine a context associated with an identified data object. Note that determine context module 630 may not exist in every implementation. Alternatively, determine context module 630 may exist and be selectively invoked. That is, determine context module 630 may be invoked for some object accesses, and not for others. Determine context module 630 may access a context service to request context information. A context service may also provide information without a request.

Determine context module 630 can include one or more modules or identifiers that enable determine context module 630 to identify a context. More or fewer modules than those shown in FIG. 6 can be provided. Role identifier 632 identifies a business role associated with an identified object. Role information can be provided by login credentials and/or enterprise authorizations provided. Object type identifier 634 identifies a type or class of an identified object. An object identifier can be stored with an object that can be read or accessed to provide the type information. Object instance identifier 636 identifies a characteristic of a particular object instance. For example, if the object instance represents a specific employee, object instance identifier 636 could access a calendar associated with the specific employee to determine the availability of the employee to take on a task, or a need of the employee to have specific information and/or actions suggested.

Determine context module 630 may also include work context identifier 638 that identifies a context in which the object is requested. Work context identifier 638 may also identify a context in which the object is to be consumed. The work context can be provided by a context provider. Interface identifier 639 identifies an interface or a channel of the object consumer. Interface identifier 639 can inform a decision regarding what specific actions are available to the object consumer based on the access channel.

Action identifier 640 enables relatedness engine 610 to identify one or more actions associated with an identified object. As discussed above, relatedness information is typically stored in metadata, which can be metadata stored with the object, or in a metadata repository, or in another location on the enterprise. Action identifier 640 can access all available actions for a given object, and then filter the actions based on context criteria from determine context module 630, or action identifier 640 can selectively access actions based on context parameters or one or more context filters.

Action suggester 650 enables relatedness engine 610 to provide an action as a suggestion. Action suggester 650 works in conjunction with action identifier 640, and may filter identified actions to provide actions that are most relevant to a given request. Action suggester 650 may include search results modifier 652 to provide related actions content specifically within a search context. Similarly to what is discussed previously, search results modifier 652 can modify results of a search query prior to, or after content addition by an advertisement module (not shown in FIG. 6).

The descriptions herein of modules or identifiers, or other components of related actions server 600, describe components that may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 7:
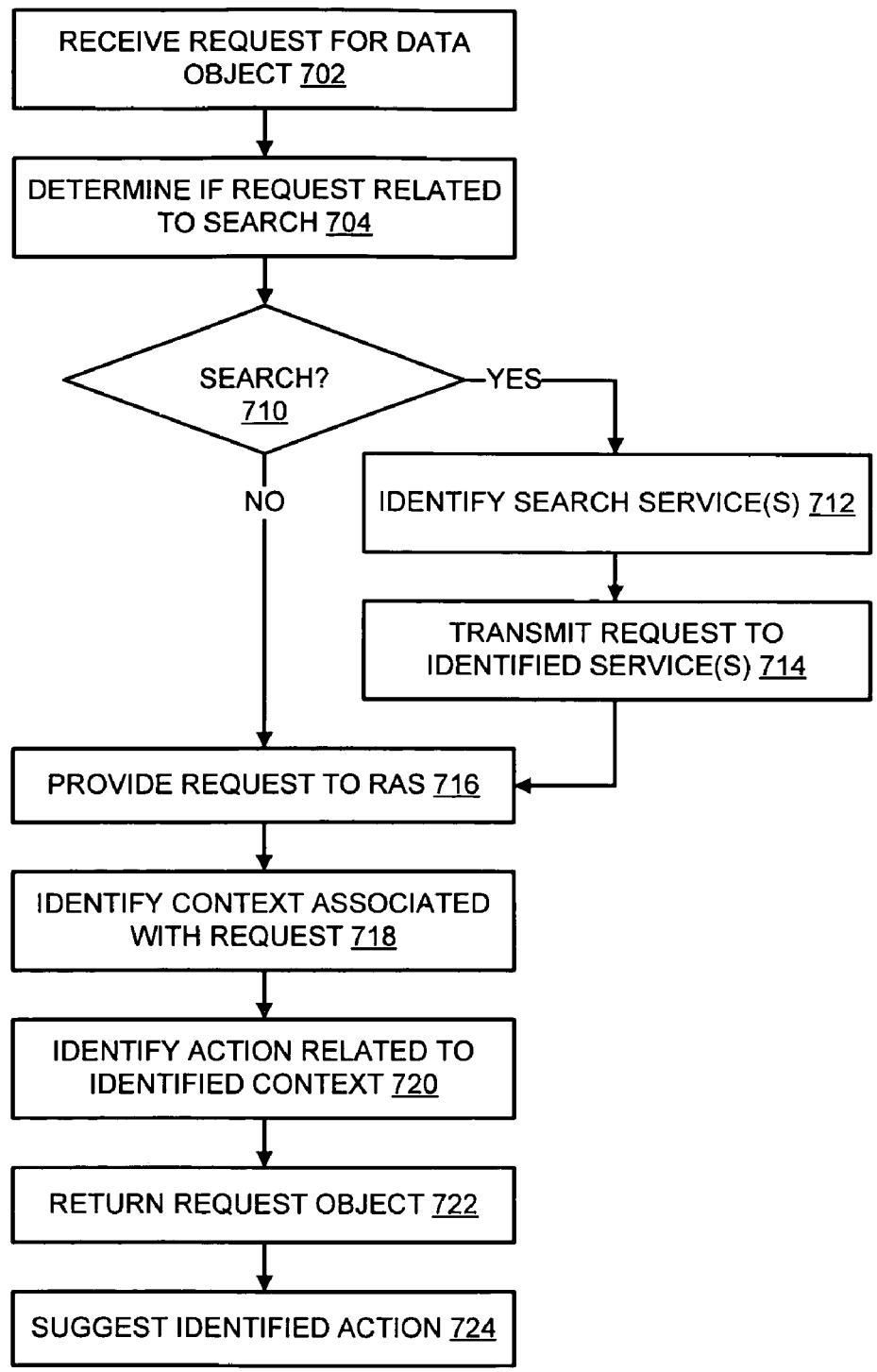
FIG. 7 is a flow diagram of an embodiment of a process for providing related actions content.

FIG. 7 is a flow diagram of an embodiment of a process for providing related actions content. Regarding the illustration of the various operations, the flow diagram as illustrated herein provides an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel.

The related actions server receives a request for a data object, 702. The request can be received from any of multiple channels, and may be for a search, or for another data object access. The related actions server determines if the request is related to a search, 704. If the request is related to a search, 710, one or more search services are identified, 712, and the request is transmitted to the identified services, 714. Identifying the search service(s) and sending the request to the identified service(s) may be operations not performed by the related actions server. If the request is not search based, 710, or after the request has been forwarded to the identified search services, 714, the request is provided to the related actions server, 716.

In one embodiment, the related actions server identifies the context associated with the request, 718. In an alternate embodiment, the related actions server simply identifies related actions, and does not identify the context. The related actions server identifies one or more actions related to the object within the identified context, if contextual information is used, or simply identifies the actions related to the object if the contextual information is not used, 720.

The system returns the requested object, 722, and the related actions server suggests the identified action(s), 724. The related actions server can provide the suggested actions within the content generated by the system to return the requested object. In one embodiment, the related actions server provides the related actions content to a content formatter, which provides the related actions content as a separate action from providing the data object content.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for providing content to a data object consumer, comprising:
receiving at a related actions server of an enterprise system a request for an identifiable data object from within a context of a software application;
parsing the request to identify a specific data object based on the request;

accessing a storage device that stores the identified, specific data object, to obtain relationship metadata of the data object in response to receiving the request,
the relationship metadata indicating
an additional object,
a relationship related to the data object, and
a condition under which the relationship exists,
where the additional object is not part of the data object, and is used in the enterprise system with the data object in accordance with the relationship indicated in the relationship metadata;
identifying, in response to receiving the request and accessing the metadata, a related action of a business process to perform using the data object and the additional object together,
the related action being an operation identified by the relationship metadata as being usable with the data object and the additional object together to accomplish a task of the business process; and
providing as a suggestion to the data object consumer, in addition to providing a result to the request, enterprise services in a user interface of a computing device that is part of the enterprise system,
where the enterprise services are provided within the context of the software application from which the request is received; and
where the enterprise services provide access to the additional object and to the identified related action to perform the identified related action with the data object and the additional object to accomplish the task.

2. The method of claim 1, wherein receiving the request further comprises:
receiving a search query for an object having specified parameters; and
identifying the specific data object having parameters that statistically match the specified parameters, in response to receiving the search query.

3. The method of claim 1, wherein receiving the request comprises:
determining that a software application of a work environment requests access to the data object.

4. The method of claim 1, wherein identifying the related action of the business process comprises:
identifying the related action of the business process based on a context of the request.

5. The method of claim 4, wherein identifying the related action of the business process based on the context of the request further comprises:
identifying the related action based on relatedness data stored in a relatedness database.

6. The method of claim 4, wherein identifying the related action of the business process based on the context of the request further comprises:
identifying the related action based on a relationship of a requestor that generated the request to a specific instance of the data object.

7. The method of claim 4, wherein identifying the related action of the business process based on the context of the request further comprises:
identifying the related action based on a role of a requestor that generated the request.

8. The method of claim 4, wherein identifying the related action of the business process based on the context of the request further comprises:
identifying the related action based on a type of the data object.

9. The method of claim 4, wherein identifying the related action of the business process based on the context of the request further comprises:
identifying the related action based on a characteristic of a specific instance of the data object.

10. The method of claim 4, wherein identifying the related action of the business process based on the context of the request further comprises:
identifying the related action based on a work environment context from which the request was generated.

11. The method of claim 4, wherein identifying the related action of the business process based on the context of the request further comprises:
determining a channel from which the request was received; and
identifying the related action based on determined channel.

12. An article of manufacture comprising a computer readable storage medium having instructions stored thereon to cause a processor to perform operations, including:
identifying a specific data object of a work environment within a context of a software application, the work environment including functions and permissions available for accessing the data object;
accessing relationship metadata associated with the data object
where the relationship metadata indicates
an additional object,
a relationship, and
a condition under which the relationship exists,
where the additional object is not part of the data object, and is used with the data object in accordance with the relationship indicated in the relationship metadata in an enterprise system of which the work environment is a part;
identifying an action of a business process indicated in the relationship metadata,
wherein the identifying is based on a context of the work environment,
the action being an operation to be performed using the data object with the additional object together to accomplish a task of the business process or a task of a related business process,
the action identified by the relationship metadata as usable with the data object and the additional object; and
providing, in addition to providing access to the data object, enterprise services to access the identified action to a consumer of the data object in the work environment to perform the identified related action with the data object and the additional object,
where the enterprise services provide access to the additional object and to the identified action of the business process to perform the identified action with the data object and the additional object to accomplish the task.

13. The article of manufacture of claim 12, wherein the content to provide instructions for identifying the data object of the work environment comprises content to provide instructions for:
identifying a data object generated as a search result in response to a search query.

14. The article of manufacture of claim 12, wherein the content to provide instructions for identifying the action based on the context of the work environment comprises content to provide instructions for:
identifying the action based on at least one of a business role of a requestor, a type of the data object, a relationship of an instance of the data object to a requestor, and a source channel of the request.

15. A related actions server comprising:

a memory device storing instructions defining:

an object identifier to identify a specific data object requested from a within a work environment, the work environment including functions and permissions available for accessing the data object;

an action identification module to access relationship metadata associated with the data object that indicates an additional object, a relationship, and a condition under which the relationship exists, where the additional object is not part of the data object, and is used with the data object in an enterprise system of which the work environment is a part in accordance with the relationship indicated in the relationship metadata, identify an action of a business process indicated in the relationship metadata, based on a context of the work environment, the action being an operation to be performed using the data object with the additional object together to accomplish a task of the business process or a task of a related business process, the action identified by the relationship metadata as usable with the data object and the additional object; and provide enterprise services to access the identified action related to the identified data object, where the enterprise services provide access to the additional object and to the identified action of the business process to perform the identified action with the data object and the additional object to accomplish the task; and an action suggestion module to present the action within the work environment to provide access to a consumer of the data object to the action and the data object within a common work context; and a processor to execute the instructions to implement the related actions server.

16. The related actions server of claim 15, the memory device further comprising instructions defining:

a context determination module to determine a context of the work environment associated with the identified data object;

wherein the action identification module is to further provide the action related to the identified data object based on the determined context.

17. The related actions server of claim 16, wherein the context determination module determines the context of the work environment to be at least one of a business role of a requestor, a type of the data object, a relationship of an instance of the data object to a requestor, and a source channel of the request.

18. The method of claim 2, wherein identifying the data object further comprises:

identifying the specific data object and identifying the related action in parallel with performing the search query.

19. The article of manufacture of claim 13, wherein the content to provide instructions for identifying the data object generated as a search result further comprises content to provide instructions for:

identifying the specific data object and identifying the related action in parallel with performing the search query.

* * * * *